US007259966B2

(12) United States Patent
Connelly, Jr. et al.

(10) Patent No.: US 7,259,966 B2
(45) Date of Patent: Aug. 21, 2007

(54) APPARATUS, SYSTEM, AND METHOD FOR REDUCING ROTATIONAL VIBRATION TRANSMISSION WITHIN A DATA STORAGE SYSTEM

(75) Inventors: Donald M. Connelly, Jr., San Jose, CA (US); Kenton Coleman Green, San Jose, CA (US); William Michael Monson, Rochester, MN (US); Michael Desmond O'Connell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/931,100

(22) Filed: Aug. 31, 2004

(65) Prior Publication Data

US 2006/0044748 A1 Mar. 2, 2006

(51) Int. Cl.
*H05K 5/00* (2006.01)

(52) U.S. Cl. ..................... 361/727; 361/685; 312/223.2

(58) Field of Classification Search ................ 361/685, 361/727
See application file for complete search history.

(56) References Cited

U.S. PATENT DOCUMENTS

| 4,890,174 | A |  | 12/1989 | Chalmers et al. ......... 360/78.12 |
| 5,159,585 | A |  | 10/1992 | Ikedo et al. ................... 369/36 |
| 5,349,486 | A | * | 9/1994 | Sugimoto et al. ......... 360/97.01 |
| 5,461,523 | A |  | 10/1995 | Hoshi ....................... 360/99.12 |
| 5,621,582 | A |  | 4/1997 | Stefansky .................... 360/75 |
| 5,677,813 | A | * | 10/1997 | Yoshida et al. ........... 360/97.02 |
| 5,706,148 | A |  | 1/1998 | Faris ........................ 360/98.07 |
| 5,870,253 | A |  | 2/1999 | Ogawa et al. .............. 360/104 |
| 5,975,735 | A | * | 11/1999 | Schmitt .......................... 700/2 |
| 6,249,432 | B1 | * | 6/2001 | Gamble et al. ............. 361/685 |
| 6,487,071 | B1 |  | 11/2002 | Tata et al. .................. 361/685 |
| 6,567,265 | B1 |  | 5/2003 | Yamamura et al. ......... 361/685 |
| 2001/0024344 | A1 |  | 9/2001 | Miyamoto et al. ........ 360/256.4 |
| 2003/0043550 | A1 |  | 3/2003 | Ives ............................ 361/726 |
| 2003/0206367 | A1 |  | 11/2003 | Huang et al. ............. 360/97.01 |
| 2005/0270737 | A1 | * | 12/2005 | Wilson et al. .............. 361/685 |

* cited by examiner

*Primary Examiner*—Anatoly Vortman
*Assistant Examiner*—Anthony Q. Edwards
(74) *Attorney, Agent, or Firm*—Kunzler & McKenzie

(57) ABSTRACT

An apparatus, system, and method are disclosed for reducing rotational vibration transmission within a data storage system. A storage device apparatus comprises a carrier having opposing first and second side plates. A support point may be disposed within the first side plate at about a longitudinal center region of the carrier. The support point is configured to contact an enclosure that mounts a plurality of carriers and is the sole support point in the first side plate. Preferably, the support point is positioned such that minimal rotational vibration is transmitted within the data storage system once the carrier is placed in an enclosure housing a plurality of carriers. A second support point may be disposed in the second side plate.

20 Claims, 5 Drawing Sheets

APPARATUS, SYSTEM, AND METHOD FOR REDUCING ROTATIONAL VIBRATION TRANSMISSION WITHIN A DATA STORAGE SYSTEM

BACKGROUND OF THE INVENTION

1. Field of the Invention

This invention relates in general to data storage systems and more particularly relates to vibration reduction systems within a data storage system.

2. Description of the Related Art

Data storage systems generally include the hardware necessary to store and retrieve data within a computer system. Often data storage systems include a plurality of disk drive assemblies mounted in a two dimensional array (i.e., multiple rows and columns) within an enclosure or support structure. One problem typically encountered in data storage systems with multiple disk drive assemblies is rotational vibration. Rotational vibration caused by mechanical movement within a disk drive assembly is transferred to neighboring disk drive assemblies through the enclosure, disrupting read/write functions and limiting the overall performance of the data storage system.

FIG. 1A illustrates a typical data storage system 100. The data storage system 100 includes an enclosure 102 and a disk drive assembly 104. The mechanical components of the disk drive assembly 104 are typically mounted within a carrier 106. The carrier 106 accordingly engages side walls 108 of the enclosure 102. Furthermore, the enclosure 102 comprises a backplane 110 that includes one or more backplane connectors 112. The backplane connectors 112 provide power to the disk drive assemblies 104 and allow data signals to be exchanged with a computer system.

FIG. 1B illustrates a typical disk drive assembly 104 with a cut away view of a hard disk drive 114. The hard disk drive 114 comprises the mechanical components of the disk drive assembly 104. For clarity, the term "disk drive" as used herein refers to the entire disk drive assembly 104, unless otherwise stated.

The hard disk drive 114 of the disk drive assembly 104 is housed in a carrier 106. The depicted carrier 106 is a box-like structure that provides support and ventilation to the mechanical components of the hard disk drive 114. Additionally, the hard disk drive 114 is connected to other computer system components through a backplane connector 116 that connects to a corresponding connector 112 of an enclosure 102 (FIG. 1A). The carrier 106 further includes opposing side plates 118 and a plurality of support points 120 disposed along the side plates 118. Typically, the support points 120 contact or engage the walls of the enclosure 102.

Within the hard disk drive 114, a rotary actuator 122 moves one or more arm assemblies 124 with a head containing read/write elements over data tracks on disk media 126. During seek operations, the actuator 122 selectively positions the head of an arm assembly 124 over the desired data tracks of the disk 126. Typically, the disk 126 is rotating while the actuator 122 pivots, swinging the arm 124 back and forth across the plane of the spinning disk 126. Accurate positioning of the read/write element is essential to the functionality of the hard disk drive 114. However, while the arm assembly 124 is being positioned, the torque, or rotational force created by the movement of the arm assembly 124, causes rotational vibration that is transmitted to the enclosure 102 and adjacent disk drive assemblies 104.

Rotational vibration transmitted to a disk drive assembly 104 can prevent accurate positioning of the head and read/write elements. Misalignment of the head consequently slows read/write operations and reduces data throughput. In addition, rotational vibration can further cause unrecoverable errors, premature disk drive failures, and mechanical wear on moving disk drive components. Problems resulting from rotational vibration are accentuated in data storage systems 100 with multiple disk drive assemblies 104. Thus, data storage systems 100 that reduce transmission of rotational vibration have a distinct advantage over conventional systems.

Referring now to FIG. 1A, the enclosure 102 supports and constrains the disk drive 104 during operation to minimize rotary motion 125. Proper constraint of the disk drive assembly 104 during operation facilitates efficient seek performance when accessing data. The support points 120 of the carrier 106 help constrain the disk drive 104. In addition, the backplane 110 of the enclosure 102 also helps prevent the drive 104 from rotating or rocking.

Generally, the support points 120 are rigidly attached to side plates 118 at each corner of the disk drive carrier 106 to constrain the rotary motion 125 of the disk drive 104. Unfortunately, by constraining the disk drive 104 with multiple support points 120, the rotary motion 125 of the hard disk drive 114 transfers torque forces 127 to the enclosure 102. The transmitted torque forces 127 cause torsion, or twisting, in the side walls 108 of the enclosure 102. The affected enclosure 102 consequently transmits rotational vibration to other disk drive assemblies 104 stored with the data storage system 100.

To prevent transmission of rotational vibration, side plates 108 typically require damping and reinforcement. In the data storage system 100, damping plates 128 and ribs 130 dampen the rotational vibration and strengthen the walls 108. The additional stiffening and damping components, however, occupy valuable space within the data storage system 100 and increase material and manufacturing costs.

From the foregoing discussion, it should be apparent that a need exists for an apparatus, system, and method that effectively reduce rotational vibration transmission within a data storage system. Beneficially, such an apparatus, system, and method would specifically overcome the known problems related to excessive rotational vibration transmitted within an enclosure to disk drive assemblies. In addition, the apparatus, system, and method should be cost effective, easy to implement, and should conserve space within the data storage system.

SUMMARY OF THE INVENTION

The present invention has been developed in response to the present state of the art, and in particular, in response to the problems and needs in the art that have not yet been fully solved by currently available data storage systems and environments. Accordingly, the present invention has been developed to provide an apparatus, system, and method for reducing rotational vibration transmission in a data storage system that overcomes many or all of the above-discussed shortcomings in the art.

The apparatus, system, and method beneficially position a single support point at about a longitudinal center region of a storage device carrier, thereby minimizing the amount of rotational vibration transferred within an enclosure of a data storage system. Furthermore, the apparatus, system, and method are cost effective, easy to implement, and conserve space within the data storage system.

The apparatus to reduce rotational vibration transmission in a data storage system, in one embodiment, is configured to sufficiently constrain a storage device, such as a disk storage device, without transferring excessive rotational vibration throughout the data storage system. The apparatus may include a carrier comprising opposing first and second side plates. The carrier may receive and/or support a storage device.

A single support point may be disposed within the first side plate at about a longitudinal center region of the carrier. In one embodiment, the support point engages an enclosure that mounts a plurality of disk drive assemblies used in a data storage system. A disk drive assembly may include a hard disk drive, a disk drive housing, and a carrier. Alternatively, other forms of storage or disk storage supported in a carrier may be mounted in an enclosure. In certain embodiments, a second support point may be disposed within the second side plate at about a longitudinal center region of the carrier. The first and second support points may be aligned. A third point connected to the backplane of the enclosure may further provide support to the carrier.

In one embodiment, the longitudinal center region comprises an area between the side plates that includes the geometric center of a shape defined by the perimeter of the carrier. The perimeter of the carrier may comprise a plane perpendicular to one of the side plates. The support point accordingly may be aligned with the longitudinal center region and disposed within the first side plate.

In an alternative embodiment, the longitudinal center region may comprise an area between the side plates that includes the center of gravity of the carrier. Preferably, the support point is aligned with the center of gravity.

In select embodiments, the support point may comprise a spring that engages the enclosure. The support point may be configured to absorb vibration caused by mechanical movement within a storage device. Furthermore, the apparatus may be connected to a backplane of the enclosure. The backplane preferably sufficiently constrains the motion caused by mechanical movement of the storage device without effectively transmitting rotational vibration to other storage devices within the enclosure.

A system of the present invention is also presented to reduce transmission of rotational vibration within a data storage system. In particular, the system, in one embodiment, includes a processor configured to store and retrieve data, memory configured to buffer storage data in response to requests from the processor, and an I/O controller configured to send and receive data storage requests. The system further includes a carrier and an enclosure that houses a plurality of carriers. The enclosure preferably has opposing first and second side walls. The side walls may be parallel to the opposing side plates of the carrier when a carrier is received into the enclosure. A single support point may be disposed between the first side plate of the carrier and a first wall of the enclosure at about a longitudinal center region of the carrier. The support point may engage the enclosure and/or the carrier. In certain embodiments, the carrier is removable from the enclosure.

A method of the present invention is also presented for reducing transmission of rotational vibration within a data storage system. The method in the disclosed embodiments substantially includes the steps necessary to carry out the functions presented above with respect to the operation of the described apparatus and system. In one embodiment, the method includes the steps necessary to connect a storage device apparatus to an enclosure.

The method may include providing a storage device apparatus. The storage device apparatus preferably comprises a carrier that has opposing first and second side plates. The carrier may house a storage device. A single support point configured to contact an enclosure may be disposed within the first side plate at about a longitudinal center region of the carrier. Next, a support point may be positioned on each side plate of the carrier at about a longitudinal center region of the carrier. Then the storage device apparatus may be placed in the enclosure.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1A:
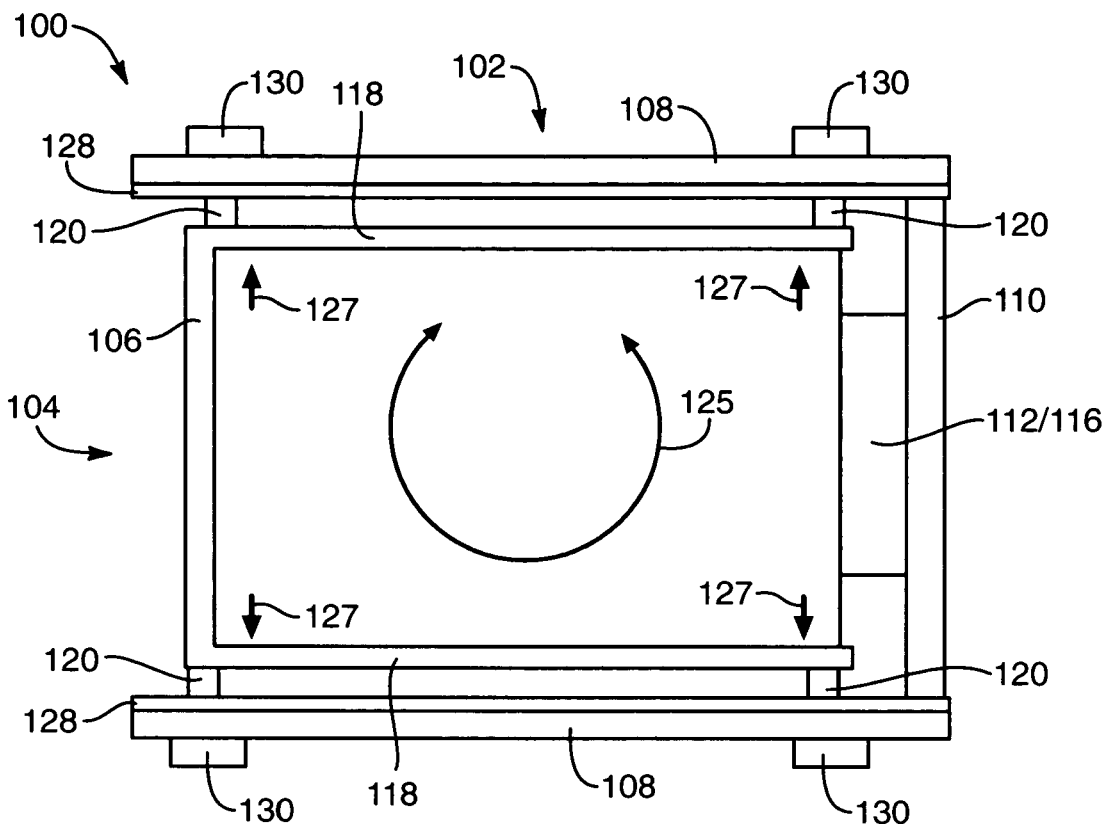
FIG. 1A is a side view illustrating a conventional data storage system.
Figure 2:
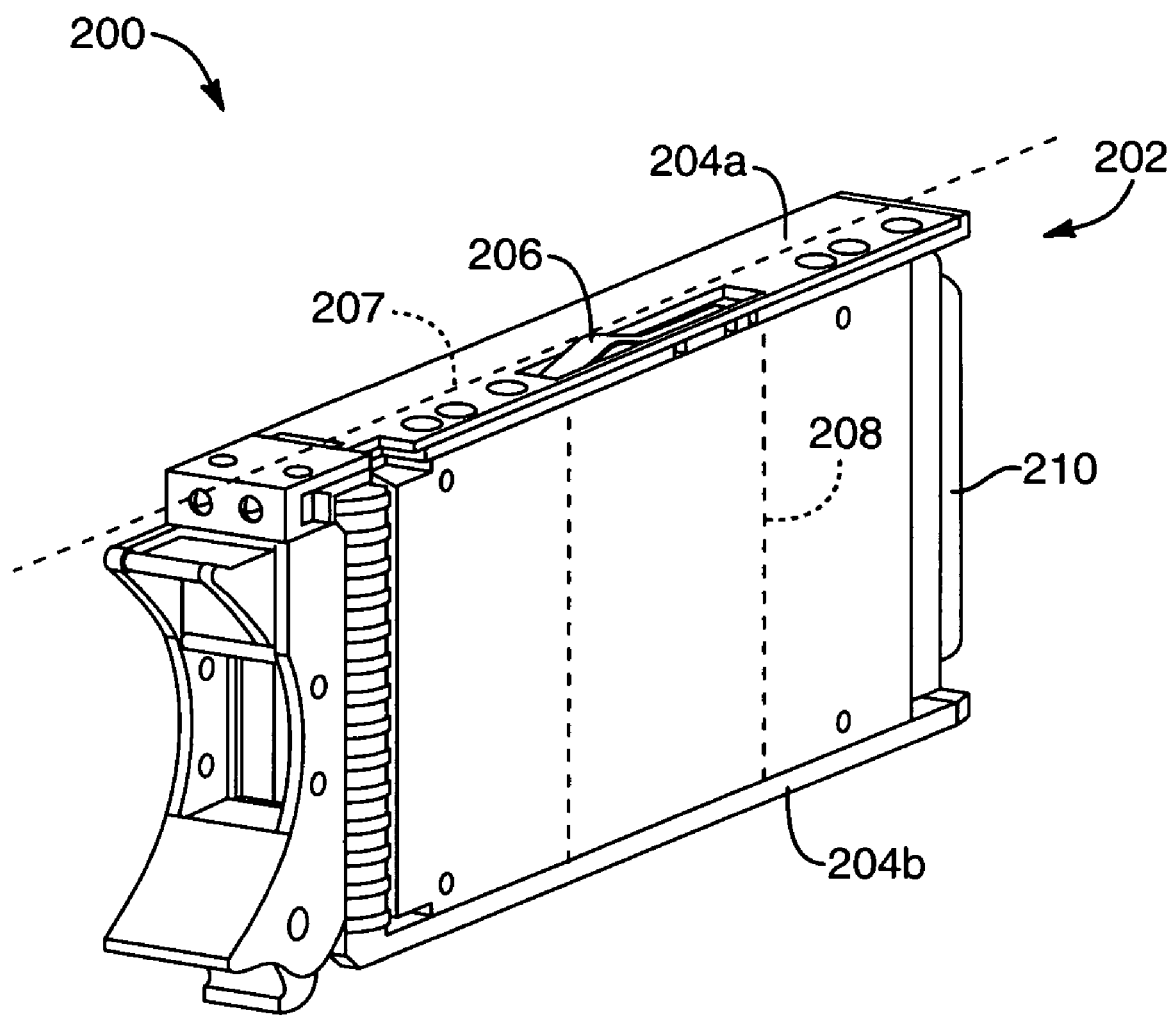
FIG. 2 is a perspective view of one embodiment of a storage device apparatus in accordance with the present invention.

FIG. 2 illustrates one embodiment of a storage device apparatus 200 in accordance with the present invention. The storage device apparatus 200 includes a carrier 202 that supports a storage device in an enclosure 102 (FIG. 1A). The carrier 202 preferably includes opposing first and second side plates 204a–b. A single support point 206 may be disposed within a first side plate 204a at about a longitudinal center region 208 of the carrier 202. In one embodiment, the longitudinal center region is centralized relative to the longitudinal axis 207.

In certain embodiments, a second support point 206 may be disposed within a second side plate 204b at about a longitudinal center region 208 of the storage device apparatus 200. The second support point 206 may or may not be aligned with the first support point 206. Furthermore, the support point 206 may engage the carrier 202 at a point distal to the longitudinal axis 207 of the first side plate. The support point(s) 206 generally help support the carrier 202 within an enclosure 102.

The storage device apparatus 200 may further comprise a backplane connector 210 that connects to a corresponding connector 112 of an enclosure 102. Accordingly, the storage device apparatus 200 may be connected at a third point of support to the backplane 110 of the enclosure 102 through the connector 210. The carrier 202 may receive and support a storage device, such as a disk storage device or other form of storage. In one embodiment, the carrier 202 houses a magnetic media hard disk drive used in a backup storage system. The storage device apparatus 200 or storage device accordingly may be connected to other computer system components through the backplane connector 210.

The enclosure 102 (FIG. 1A) typically facilitates mounting multiple storage device apparatus 200 used in a data storage system. The support point 206 contacts the enclosure 102 and may isolate and dampen some of the energy transferred between carriers 202 within the data storage system 100. The support point 206 in certain embodiments may comprise a spring, dampener, fastener, or the like. Springs 206, as depicted, effectively support the storage device apparatus 200 within an enclosure 102 and are able to adapt to enclosures 102 that vary in size. The springs 206 also absorb transferred energy and partially reduce the transfer of rotational forces 125, 127 (FIG. 1A) from the storage device apparatus 200 to the enclosure 102. The springs 206, however, do not resist high levels of transferred energy.

The present invention effectively reduces the number of support points 206 and positions the support point 206 such that the majority of the rotational forces 125, 127 caused by mechanical movement within the carrier 202 are directed away from the support point 206. Thus, minimal amounts of energy are transferred through the support point 206.

As discussed above, rotational motion 125 (FIG. 1A) of a disk drive assembly 104 is traditionally constrained by multiple support points 120 positioned on the side plates 118 near the corners of the disk drive carrier 106. As a result, the torque forces 127 transfer rotational vibration to the enclosure 102 directly through the support points 120.

The side walls 108, which are typically normal to the torque forces 127, are particularly susceptible to deformation and vibration caused by the transmitted forces 127. Additionally, the various torque forces 127 exerted on the support points 120 are generally uneven, causing torsion in the walls 108, or causing torsional plate vibration modes. Torsional plate modes cause distortion in the walls 108. Side walls 108 in a torsional plate mode transmit rotational vibration through the support points 120 to other storage devices stored within the enclosure 102. Consequently, the enclosure 102 typically includes damping 128 and stiffening 130 to minimize the effects of transmitted rotational vibration.

Support points 206 (FIG. 2) positioned at about a longitudinal center region 208 of a storage device apparatus 200, however, do not constrain the rotational motion 125 of the storage device apparatus 200. As a result, rotational vibration, traditionally caused by constraining the disk drive 104 (FIG. 1A) with a plurality of support points 120, is drastically reduced in the present invention. The rotational vibration caused by mechanical movement within the storage device is mainly absorbed by the backplane connector 210 and the backplane 110 of the enclosure 102 (FIG. 1A).

Also, the storage device apparatus 200 with a single support point 206 resists rotation caused by torsional walls 108 described in relation to FIG. 1A. Because the single support point 206 is placed at about a longitudinal center region 208 of the carrier 202, thereby minimizing the transfer of uneven forces, the storage device apparatus 200 does not rotate or rock with the torsional modes of the wall 108. The single support point 206 also reduces the occurrences of torsional plate modes in the side walls 108.

Figure 3:
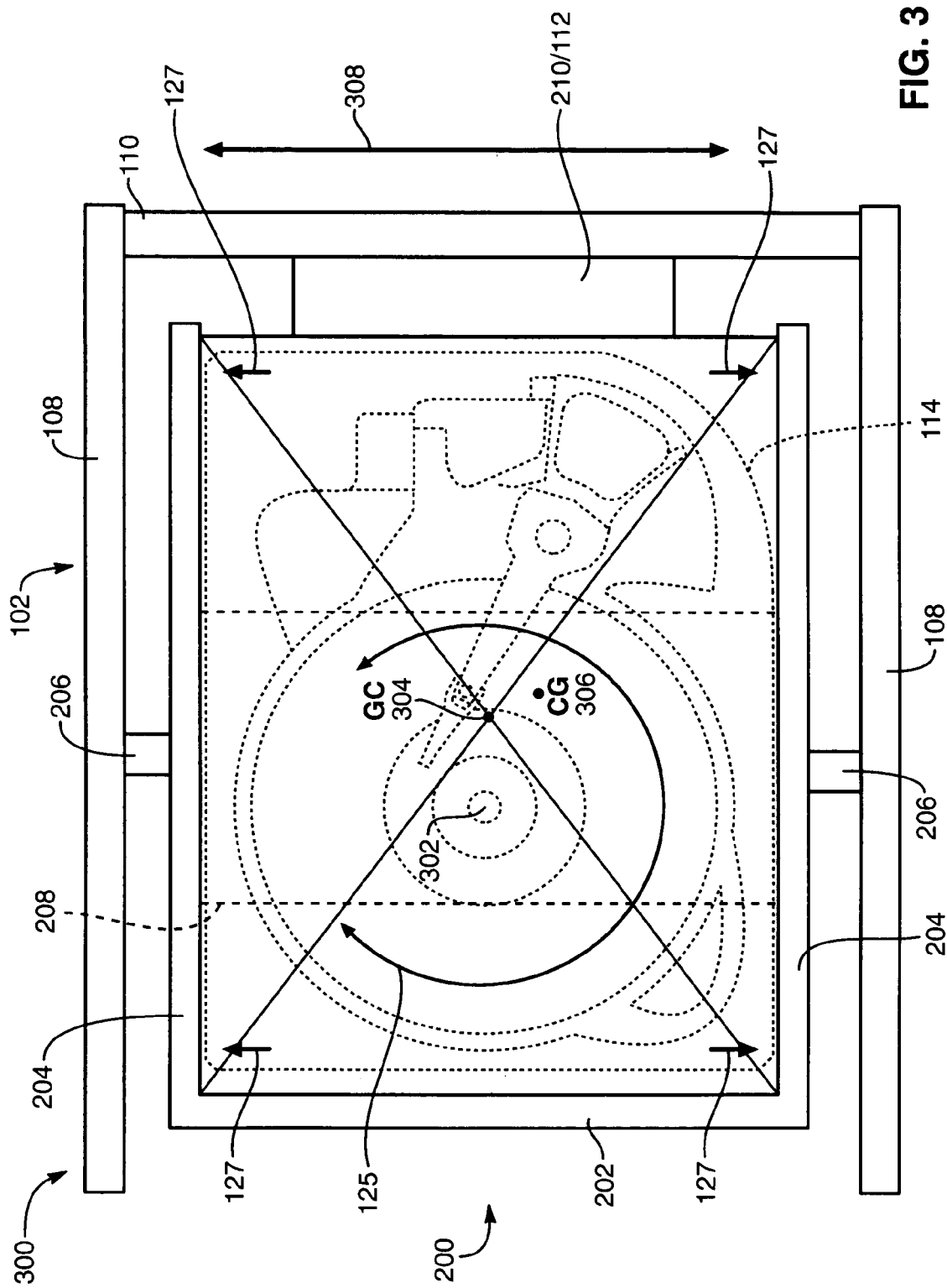
FIG. 3 is a side view of one embodiment of a data storage system in accordance with the present invention.

FIG. 3 illustrates one embodiment of a data storage system 300 that includes a storage device apparatus 200 placed within an enclosure 102. The storage device apparatus 200 in the depicted embodiment includes a hard disk drive 114 represented by dashed lines.

In one embodiment, the longitudinal center region 208, also generally represented by dashed lines, comprises an area between the side plates 204 that includes the geometric center 304 of a shape defined by the perimeter of the carrier 202 of the storage device apparatus 200. The perimeter of the carrier 202 is perpendicular to a plane defined by the side plate 204. Accordingly, the support point 206 may be disposed between a first side wall 108 of the enclosure 102 and a first side plate 204 of a carrier 202 at about the longitudinal center region. The support point 206 may further be aligned with the geometric center 304 of the carrier 202.

Figure 1B:
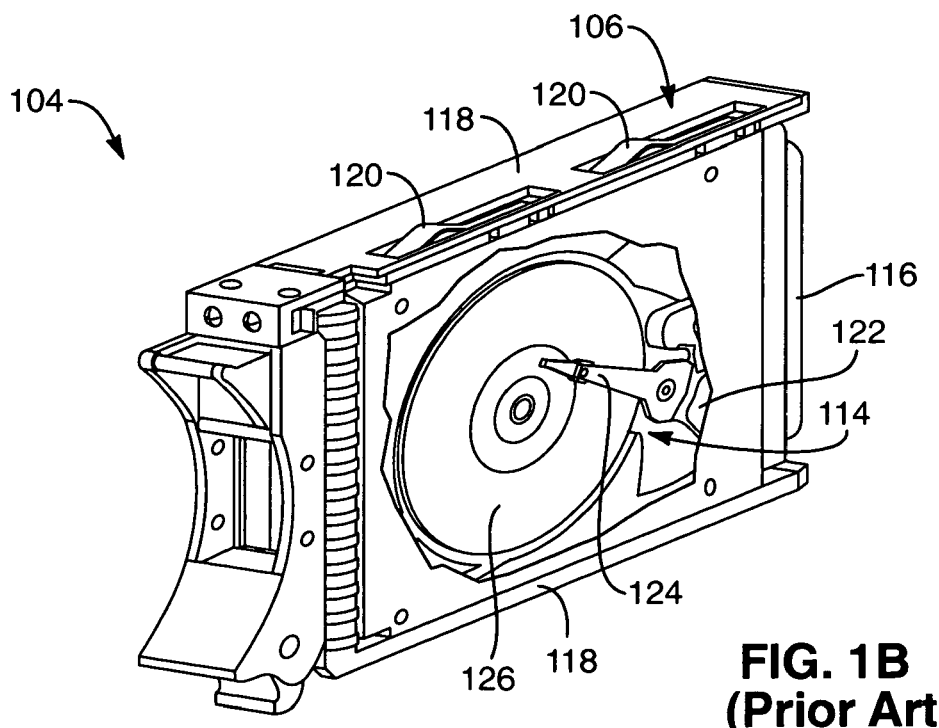
FIG. 1B is a perspective view of a conventional disk drive assembly.

Alternatively, the longitudinal center region 208 may be defined by the center of gravity 306 of the carrier 202 and may include an area between the side plates 204 that includes the center of gravity 306. The support point 206 may be aligned with the center of gravity 306. The center of gravity 306 is typically located off-center toward the actuator 122 (FIG. 1B).

The longitudinal center region 208 in a further embodiment may comprise an area between the side plates 204 that includes the spindle 302 of the hard disk drive 114. The support point(s) 206 accordingly may be aligned with the spindle 302. The longitudinal center region 208 may, in certain embodiments, comprise a large area relative to the storage device apparatus 200. Additionally, the support point 206 may or may not be aligned with a specific point of reference.

In certain embodiments, the support point 206 may be disposed on the wall 108 of the enclosure 102. Accordingly, the support point 206 may be configured to engage a carrier 202 received into the enclosure 102 at about a longitudinal center region of the carrier 202. The support point 120 may be removably attached to the carrier 202 or to the enclosure 102 and disposed at about a longitudinal center region 208 of the carrier 202.

Those of skill in the art will recognize that the longitudinal center region 208 may comprise various shapes, sizes, and configurations. The described embodiments are not intended to limit the scope of the present invention, but are discussed for illustrative purposes only.

FIG. 3 further illustrates the torque forces 127 discussed in relation to FIG. 1A. Benefits of the invention are achieved by decoupling the enclosure 102 from the torque forces 127 of the disk drive 114, which is accomplished by disposing a single support point 206 between a side wall 108 of an enclosure 102 and a side plate 204 of a carrier 202 at about a longitudinal center region 208 of the carrier 202. Consequently, transmission of rotational vibration within the data storage system 300 is minimized, as are torsional plate modes occurring in the walls 108 of the enclosure 102.

The forces 125, 127 that cause the storage device apparatus 200 to rock are absorbed by the single support point(s) 206 and by the backplane connector 210. Also, the single support point 206, by virtue of its central location, limits transfer of rotational vibration to the enclosure 102, thereby preventing torsional plate modes in the plates 108. Furthermore, the single support point 206 resists vibration and rotation caused by rotational vibration transferred from plates 108 in a torsional mode. The data storage system 300 consequently experiences fewer errors caused by rotational vibration and has higher data throughput.

Typically, the storage device apparatus 200 is connected to the backplane 110 of the enclosure 102. In select embodiments, the storage device apparatus 200 is connected to the backplane 110 through the backplane connectors 210, 112. The present invention utilizes the backplane 110 to arrest the rotational motion 125 (FIG. 1A) of the storage device apparatus 200.

The backplane 110, which is sufficiently rigid, provides substantially all of the rotational constraint required for the storage device apparatus 200 to function efficiently. The rotational forces 125, 127 of the storage device apparatus 200 are typically parallel to a disk plane in the hard disk drive 114 defined by the disk media 126. The rotational forces 125, 127 of the storage device apparatus 200 are also in substantially the same plane as the backplane 110. Consequently, the backplane 110 does not transfer the forces 125, 127 as effectively as support points 120 (FIG. 1A) disposed within the side plates 118 of the conventional disk drive assemblies 104. Thus, by relying on the backplane 110 to arrest the rotational motion 125 of the storage device apparatus 200 rather than multiple support points 120 along the side plates 118, a single support point 206 properly positioned cooperates with the backplane 110 and backplane connectors 210, 112 to reduce transmission of rotational vibration within the data storage system 300.

The force 308 illustrates the direction of the forces 125, 127 transferred to the enclosure 102 through the backplane 110. Because the force 308 is substantially parallel to the plane of the backplane 110, torsion in the side plates 108 of the enclosure 102 is minimal. As a result, the side plates 108 of the enclosure 102 require fewer dampening 128 and stiffening 130 components than with conventional enclosures 102 (FIG. 1A).

Because certain components such as additional support points (springs) 120, damper plates 128, ribs 130 (FIG. 1A), and the like may be eliminated, the data storage system 300 is more efficiently produced than traditional data storage systems 100 (FIG. 1A). The system 300 may also require less space, because additional damping layers 128 are removed. Furthermore, the enclosure 102 may be made from less expensive materials, because lower structural integrity of the enclosure 102 is required.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
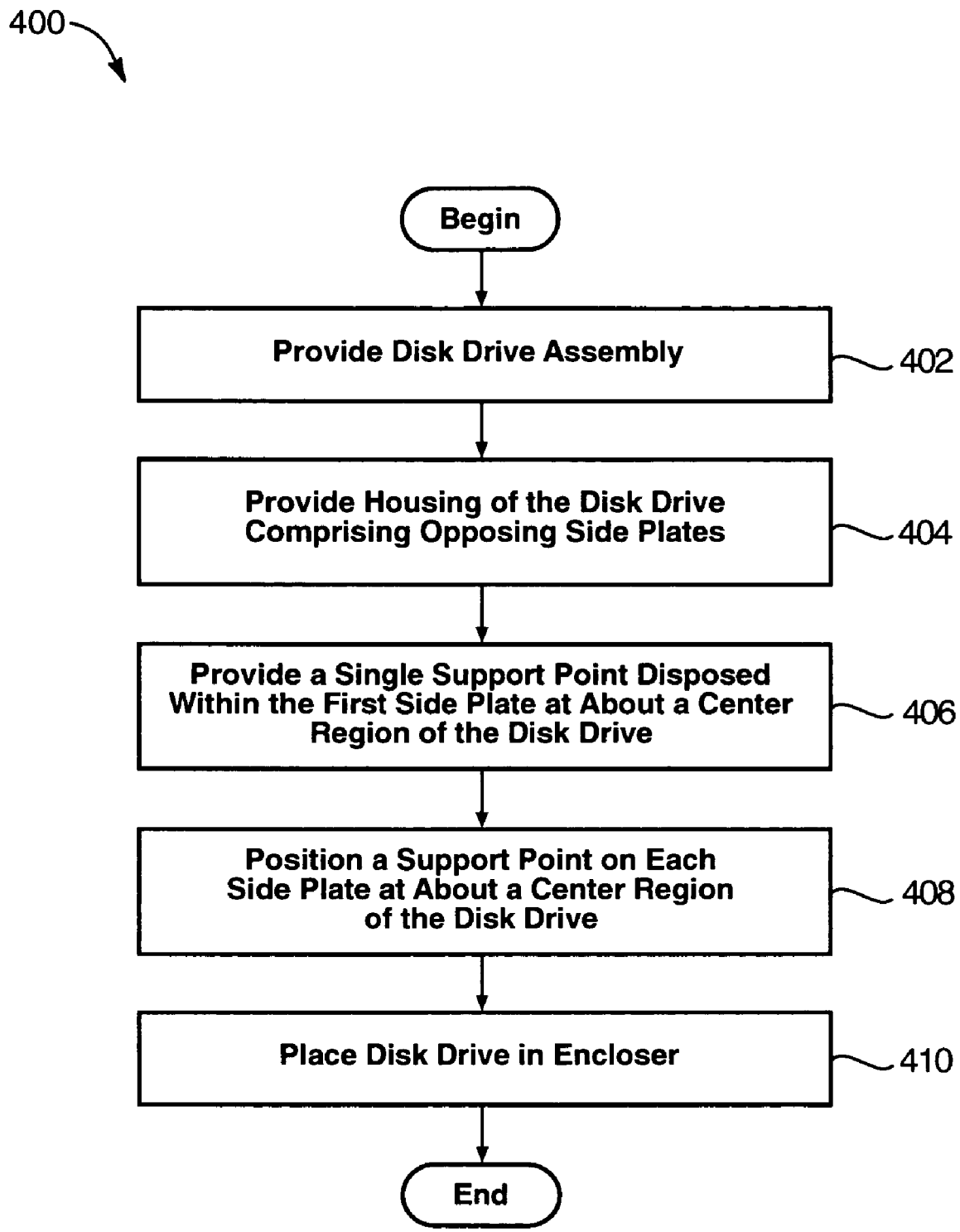
FIG. 4 is a schematic flow chart diagram illustrating one embodiment of a method for connecting a storage device apparatus to an enclosure in accordance with the present invention.

FIG. 4 illustrates one embodiment of a method 400 for connecting a storage device apparatus 200 to an enclosure 102. The method 400 begins by providing 402 a storage device apparatus 200. The storage device apparatus 200 preferably provides 404 a carrier 202 with opposing first and second side plates 204a–b. The storage device apparatus 200 further provides 406 a single support point 206 disposed within the first side plate 204a at about a longitudinal center region 208 of the carrier 202. Support points 206 may further be positioned 408 on each side plate 204a–b of the carrier 202 at about a longitudinal center region 208 of the storage device apparatus 200. The storage device apparatus 200 may then be placed 410 in the enclosure 102. Alternatively, the support points 206 may be disposed on a wall 108 of an enclosure 102.

Figure 5:
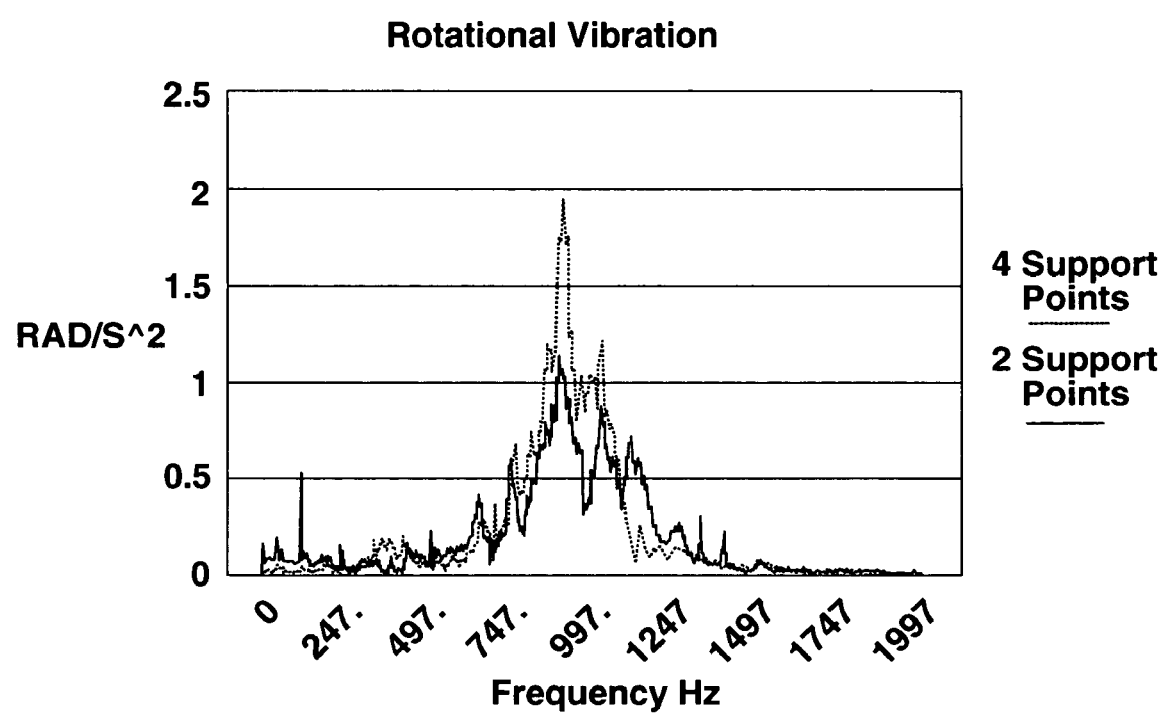
FIG. 5 is a graph illustrating the rotational vibration of a disk drive assembly with four support points compared to a storage device apparatus with two support points operating within a data storage system comprising a plurality of disk drive assemblies.

FIG. 5 is a graph illustrating empirically the amount of rotational vibration transferred to a hard disk drive 114 through an enclosure 102 housing a plurality of operating disk drive assemblies. The vertical axis represents rotational acceleration expressed in radians per second squared. The horizontal axis represents torsional vibration frequency measured in Hertz, which is the number of oscillations (cycles) per second. The first measurement represented by the dotted line is the amount of rotational vibration measured for a disk drive 104 mounted with four support points 120 in the enclosure 102, similar to the arrangement illustrated in FIG. 1A. The amount of rotational vibration reaches nearly two RAD/s$^2$. In contrast, the storage device apparatus 200 mounted with only two support points 206, configured according to one embodiment of the present invention (FIG. 3), experiences significantly less rotational vibration, peaking at just over one RAD/s$^2$ in the tested embodiment. Consequently, the amount of rotational vibration transmitted within the data storage system 300 is reduced in the storage device apparatus 200 mounted with just two support points 206 in accordance with the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A storage device apparatus, comprising:
   a carrier configured to receive and support a storage device, the carrier comprising opposing first and second side plates, the storage device comprising a connector configured to connect to a backplane of an enclosure; and
   a single support point at each of the first and second side plates, each support point configured to engage the first and second side plates at about a longitudinal center region of the carrier, the support point for each side plate configured to also engage an enclosure, the enclosure configured to receive a plurality of carriers and to engage the carrier and storage device for support exclusively at the backplane connector and at the support points engaging the first and second sidewalls of the carrier.

2. The storage device apparatus of claim 1, wherein the longitudinal center region comprises an area between the side plates that includes the geometric center of a shape defined by the perimeter of the carrier, the perimeter perpendicular to a plane defined by the first side plate, and wherein the support point is aligned with the longitudinal center region.

3. The storage device apparatus of claim 1, wherein the longitudinal center region comprises an area between the side plates that includes the center of gravity of the carrier and the storage device, and wherein the support point is aligned with the center of gravity.

4. The storage device apparatus of claim 3, wherein the longitudinal center region that includes the center of gravity of the carrier and the storage device excludes the geometric center of a shape by defined the perimeter of the carrier, the perimeter perpendicular to a plane defined by the first side plate.

5. The storage device apparatus of claim 1, wherein the support point is configured to absorb vibration caused by mechanical movement within a storage device of the carrier.

6. The storage device apparatus of claim 1, wherein the support point engages the carrier off of the longitudinal axis of the first side plate.

7. A data storage system, the system comprising:
   a processor configured to store and retrieve data;
   memory configured to buffer storage data in response to requests from the processor;
   an I/O controller configured to send and receive data storage requests;
   a storage device with a backplane connector;
   an enclosure configured to receive a plurality of carriers, the enclosure comprising opposing first and second walls and a backplane comprising a connector connected to the backplane connector of the storage device;
   a carrier configured to receive and support the storage device, the carrier comprising opposing first and second side plates; and
   a single support point disposed between the first wall and the first side plate and a single support point disposed between the second wall and second side plate, the support points at about a longitudinal center region of the carrier, the support points configured to contact the enclosure; and
   wherein the enclosure engages the carrier and storage device for support exclusively at the backplane connector and at the supports engaging the first and second sidewalls of the carrier.

8. The system of claim 7, wherein the longitudinal center region comprises an area between the side plates that includes the geometric center of a shape defined by the perimeter of the carrier, the perimeter perpendicular to a plane defined by the first side plate, and wherein the support point is aligned with the longitudinal center region.

9. The system of claim 7, wherein the support point engages the carrier off of the longitudinal axis of the first side plate.

10. The system of claim 7, wherein the longitudinal center region of the carrier comprises an area between the side plates that includes the center of gravity of the carrier and the storage device, and wherein the support point is aligned with the center of gravity.

11. The system of claim 10, wherein the longitudinal center region that includes the center of gravity of the carrier and the storage device excludes the geometric center of a shape defined the perimeter of the carrier, the perimeter perpendicular to a plane defined by the first side plate.

12. The system of claim 7, wherein the enclosure is configured to house a plurality of disk storage devices used in a backup storage system.

13. A method for connecting a storage device apparatus to an enclosure, the method comprising:
   providing a storage device apparatus, comprising:
      a carrier configured to receive and support a storage device, the carrier comprising opposing first and second side plates, the storage device comprising a connector configured to connect a backplane of an enclosure; and
      a single support point at each of the first and second side plates, each support point configured to engage the first and second side plates at about a longitudinal center region of the carrier, the support point for each side plate configured to also engage an enclosure, the enclosure configured to receive a plurality of carriers and to engage the carrier and storage device for support exclusively at the backplane connector and at the support points engaging the first and second sidewalls of the carrier;
   positioning a support point on each side plate at about a longitudinal center region of the carrier; and
   placing the storage device apparatus in the enclosure.

14. The method of claim 13, wherein placing the storage device apparatus in the enclosure comprises positioning the support point such that the longitudinal center region comprises an area between the side plates that includes the geometric center of a shape defined by the perimeter of the carrier, the perimeter perpendicular to a plane defined by the first side plate, and the support point is aligned with the longitudinal center region.

15. The method of claim 13, wherein placing the storage device apparatus in the enclosure comprises positioning the support point such that the longitudinal center region comprises an area between the side plates that includes the center of gravity of the carrier and the storage device and the support point is aligned with the center of gravity.

16. The method of claim 15, wherein the longitudinal center region that includes the center of gravity of the carrier and the storage device excludes the geometric center of a shape defined the perimeter of the carrier, the perimeter perpendicular to a plane defined by the first side plate.

17. A storage device apparatus, comprising:
an enclosure configured to receive a plurality of carriers, the enclosure comprising opposing first and second walls and a backplane comprising a connector configured to connect to a backside of a storage device mounted in a carrier; and
a single support point at each of the opposing first and second walls, each support point configured to exclusively contact the carrier at about a longitudinal center region of the carrier, each support point disposed between an opposing wall of the enclosure and a side plate of the carrier, wherein the enclosure is further configured without a support on a front side of the carrier and the storage device, the front side being opposed to the backplane connector.

18. The storage device apparatus of claim 17, wherein the longitudinal center region of the carrier comprises an area between opposing side plates that includes the geometric center of a shape defined by the perimeter of the carrier, the perimeter perpendicular to a plane defined by the first side plate, and wherein the support point is aligned with the longitudinal center region.

19. The storage device apparatus of claim 17, wherein the longitudinal center region of the carrier comprises an area between opposing side plates that includes the center of gravity of the carrier and the storage device, and wherein the support point is aligned with the center of gravity.

20. The storage device apparatus of claim 17, wherein the support point is configured to absorb vibration caused by mechanical movement within a storage device of a carrier.

* * * * *